June 14, 1960 W. B. FELL 2,940,784
PRECISION THREADED ADJUSTMENT
Original Filed June 6, 1956
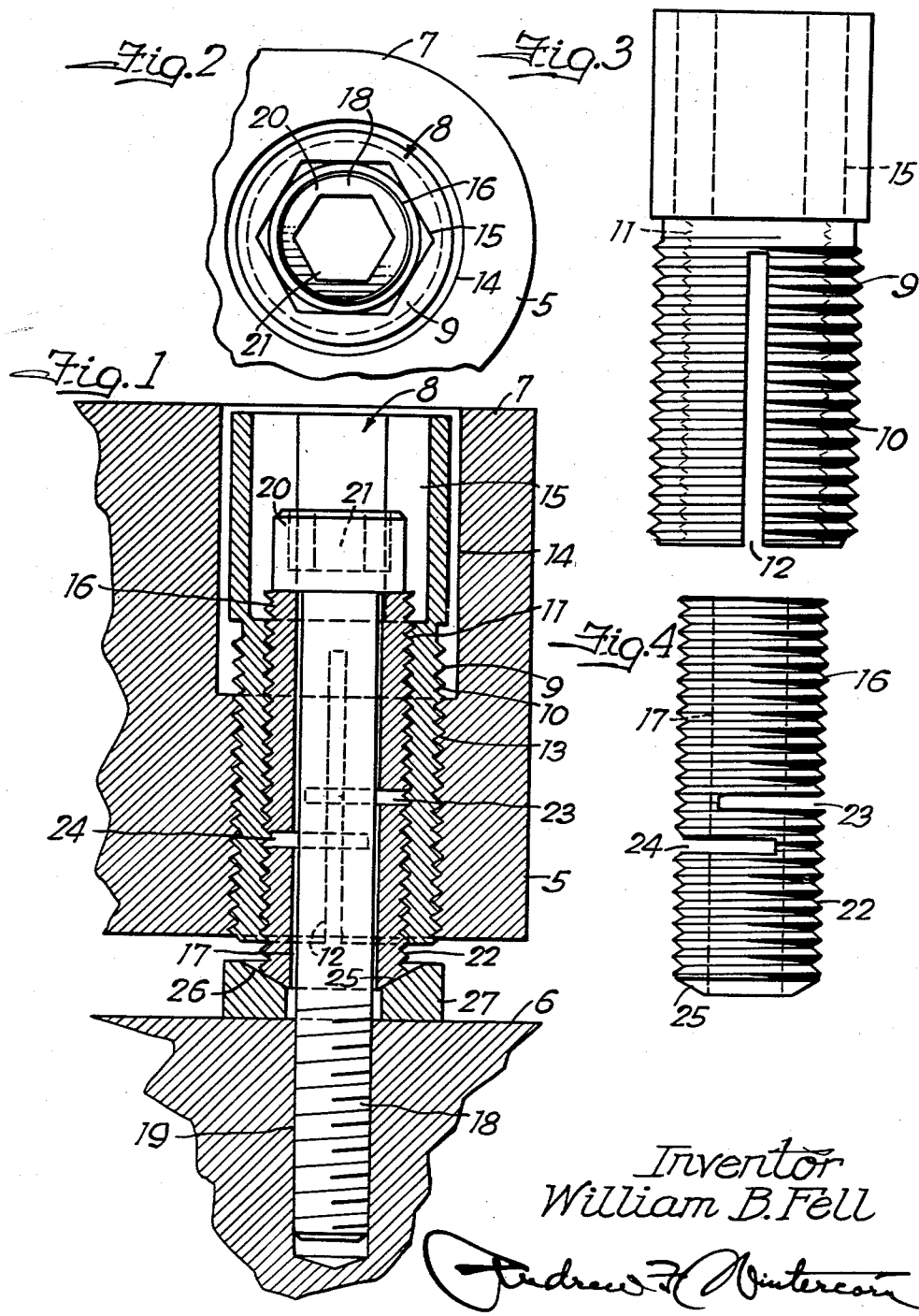
Inventor
William B. Fell

United States Patent Office 2,940,784
Patented June 14, 1960

2,940,784

PRECISION THREADED ADJUSTMENT

William B. Fell, 320 McLain Ave., Rockford, Ill.

Original application June 6, 1956, Ser. No. 589,731. Divided and this application June 5, 1957, Ser. No. 663,678

5 Claims. (Cl. 287—62)

This application is a division of my copending application, Serial No. 589,731, filed June 6, 1956.

My invention relates to improved level adjusting screw means for very fine setting of a precision level in a portable level base or in a fixed support on a machine or instrument equipped with a level, the adjustment involving a differential threading rate between a sleeve that is threaded in a hole in the frame of the level and a hollow screw that is threaded inside the sleeve and is fastened to the base or support by means of a combined hold-down and clamping screw entered through the sleeve and passed through the hollow screw and threaded in the base. With a combination of say twenty threads per inch on the exterior of the sleeve and eighteen threads per inch on the inside, a ten to one ratio is obtained which gives a very fine adjustment. To further increase the accuracy, by eliminating play in the threads, the sleeve is slotted lengthwise for radial expansibility, and the hollow screw is slotted intermediate its ends from opposite sides transversely in closely spaced relation for longitudinal compressibility, and hence, when the hold-down screw is tightened enough to hold the hollow screw against turning, that is generally enough to take up play between its threads and the threads inside the sleeve as well as between the external threads on the sleeve and the threads in the frame.

The invention is illustrated in the accompanying drawing, in which—

Fig. 1 is an enlarged longitudinal section through my improved precision threaded adjustment, shown applied between the frame of a micro-precision level and its supporting frame or base;

Fig. 2 is a plan view of Fig. 1, and

Figs. 3 and 4 are side views of the outer sleeve and hollow inner screw, respectively, seen in section in Fig. 1.

The same reference numerals are applied to corresponding parts throughout the views.

Referring to the drawing, the reference numerals 5 and 6 designate the frame and supporting base, respectively, of a micro-precision level, the frame 5 being of circular form for support of a circular level unit and having three radial projections like that seen at 7 at Fig. 2 spaced 120° apart, each incorporating a precision threaded adjustment 8 for mounting the level on the base 6. Each of these adjustments 8 is specially constructed to enable precision adjustment of the level relative to the base 6 (or a fixed support on a machine or instrument) and to maintain such adjustment once made. Each support comprises a sleeve 9 that is threaded right-handed externally, as indicated at 10, and right-handed internally, as indicated at 11, and is slotted lengthwise diametrically thereof, as indicated at 12 for radial expansibility of the threaded portion, the sleeve being threaded in the reduced threaded lower end portion 13 of the bore 14 in projection 7 and having a hexagonal socket 15 in the upper end thereof, in which an Allen wrench may be inserted to turn the sleeve 9 in either direction for up or down adjustment of the level with respect to the base.

A hollow screw 16 has an axial bore 17 through which a clamping screw 18 can be passed and threaded in a vertical hole 19 provided in the base, the cylindrical head 20 on the screw passing freely through the bore in the sleeve 9 and having a socket 21 therein to receive an Allen wrench for tightening. The external threads 22 on the screw 16 match the threads 11 in the sleeve 9 so that the screw 16 can be threaded in the lower end portion of the sleeve, as shown in Fig. 1. The screw 16 is slotted intermediate its ends from opposite sides transversely in closely spaced relation, as shown at 23 and 24, for longitudinal compressibility, and hence, when the screw 18 is tightened enough to fasten the hollow screw 16 to the base 6 and hold it against turning, that is generally enough to take up play between the threads 22 on the hollow screw and the threads 11 in the sleeve 9 and also between the external threads 10 on the sleeve and the threads 13 in the frame 5. The bore 17 in the hollow screw 16 is large enough in diameter in relation to the screw 18, as indicated in Fig. 3, so that the screw 16 is free to take its own inclination independently of screw 18 as required for precision levelling of the level. The lower end 25 of the screw 16 is tapered for self-centering fit in the concave top 26 of a washer 27 that is flat on the bottom and is seated on the flat top of the base 6. This mounting for the screw 16 also permits such small inclination of the screw 16 with respect to the base 6 as may be necessary in order to get the level properly adjusted with respect to the base.

In operation, assuming that there are say twenty threads per inch at 10 on the outside of the sleeve 9 and say eighteen threads per inch at 11 on the inside of the sleeve and at 22 on the outside of the hollow screw 16, a ten to one ratio is obtained for a very fine adjustment. In other words, ten turns of the sleeve 9 are required to raise or lower one side of the frame 5 relative to base 6 the equivalent of only one thread on screw 16. When screw 18 is loosened, sleeve 9 may be adjusted in either direction independently of screw 16, the latter then turning with the sleeve freely relative to the base. It is also clear that the screw 18, while ordinarily tightened only enough to take up play between the parts, may be tightened a little more to lock the parts in adjusted position.

It is believed the foregoing description conveys a good understanding of the objects and advantages of my invention. The appended claims have been drawn to cover all legitimate modifications and adaptations.

I claim:

1. In a precision threaded adjustment for precision adjustment of one member with respect to another member, the combination of a sleeve that has internal and external threads and is threaded in one of said members and adapted to be turned in either direction for the said adjustment, a screw threaded in said sleeve and fixed to the other of said members, the sleeve being split lengthwise a major portion of its length and in relation to a major portion of the length of said screw for radial expansibility and the screw being slotted transversely intermediate its ends from opposite sides for endwise compressibility, and means for subjecting said screw to endwise compression.

2. A structure as set forth in claim 1, wherein the means for compressing the screw endwise comprises a bolt extending through a hole provided in said screw longitudinally thereof, said bolt having a head on one end bearing on the adjacent end of said screw and having its other end threaded in a fixed support, with respect to which said screw is adapted to be held against turning when the bolt is tightened to a predetermined extent, so that the sleeve may be turned relative to the screw for threading adjustment.

3. In a precision threaded adjustment for precision adjustment of one member with respect to another member, the combination of a sleeve that has internal and external threads and is threaded in one of said members and adapted to be turned in either direction for the said adjustment, a screw threaded in said sleeve and fixed to the other of said members, the external threads and internal threads on said sleeve being different in number per inch, whereby to provide a differential threading action, the sleeve being split lengthwise a major portion of its length and in relation to a major portion of the length of said screw for radial expansibility and the screw being slotted transversely intermediate its ends from opposite sides at longitudinally spaced intervals for endwise compressibility, and means for subjecting said screw to endwise compression.

4. In a precision threaded adjustment for precision adjustment of one member with respect to another member, the combination of a sleeve that has internal and external threads and is threaded in one of said members and adapted to be turned in either direction for the said adjustment, a screw threaded in said sleeve and fixed to the other of said members, the external threads and internal threads on said sleeve being different in number per inch, whereby to provide a differential threading action, the sleeve being split lengthwise a major portion of its length and in relation to a major portion of the length of said screw for radial expansibility and the screw being slotted transversely intermediate its ends for endwise compressibility, and means for subjecting said screw to endwise compression, said means comprising a screw entered freely in an axial hole provided in the last mentioned screw and threaded at its inner end in a part fixed in relation to said last mentioned screw and having a head on the outer end for applying pressure, when tightened on the outer end of said last mentioned screw.

5. In a precision threaded adjustment for precision adjustment of one member with respect to another member, the combination of a sleeve that has internal and external threads and is threaded in one of said members and adapted to be turned in either direction for the said adjustment, a screw threaded in said sleeve and rotatably adjustably fixed in relation to the other of said members, the external threads and internal threads on said sleeve being different in number per inch, whereby to provide a differential threading action, the sleeve being split lengthwise a major portion of its length and in relation to a major portion of the length of said screw for radial expansibility and the screw being slotted transversely intermediate its ends for endwise compressibility, and means for subjecting said screw to endwise compression, and holding the same against turning from adjusted position, said means comprising a hold-down screw entered freely through an axial hole provided in the last mentioned screw and threaded at one end in the member supporting said last mentioned screw and having a head on the other end abutting the outer end of said last mentioned screw.

References Cited in the file of this patent

UNITED STATES PATENTS

| | | |
|---|---|---|
| 944,461 | Olander et al. | Dec. 28, 1909 |
| 1,491,075 | Batchelor | Apr. 22, 1924 |
| 2,035,055 | Dyer | Mar. 24, 1936 |
| 2,367,259 | Beach | Jan. 16, 1945 |
| 2,398,070 | Allen | Apr. 9, 1946 |
| 2,424,242 | Krause | July 22, 1947 |
| 2,485,280 | Grace | Oct. 18, 1949 |
| 2,576,438 | Beach | Nov. 27, 1951 |